3,061,565
SILICONE ELASTOMERS HEAT STABILIZED WITH FERRIC HYDROXIDE

William R. Collings, Midland, Mich., assignor to Dow Corning Corporation, Midland, Mich., a corporation of Michigan
No Drawing. Filed Mar. 11, 1959, Ser. No. 798,608
6 Claims. (Cl. 260—29.1)

This invention relates to silicone elastomers heat stabilized with minute amounts of ferric hydroxide.

The use of iron oxide as a heat stabilizer in silicone elastomers is now well known in the art. Good heat stability is not attained consistently unless at least one and preferably three parts by weight of iron oxide per 100 parts of polymer are employed. At this loading any stock so stabilized is so thoroughly pigmented with the well known intense reddish-rust color of iron oxide that it is impractical if not impossible to hide the color with other pigments. There is presently a commercial demand for silicone elastomers having the heat stability of iron oxide-stabilized stocks but sufficiently little pigmentation that some color control of the ultimate elastomer is possible.

The primary object of this invention then is to provide industry with a pigmentable heat stable silicone elastomer.

This invention relates to a composition of matter comprising an essentially diorganopolysiloxane in which all the organic radicals are selected from the group consisting of monovalent hydrocarbon radicals, halogenated monovalent hydrocarbon radicals and cyanoalkyl radicals and from 0.001 to 0.75 part by weight per 100 parts by weight of the diorganopolysiloxane of iron added as ferric hydroxide.

The "essentially diorganopolysiloxane" is a polysiloxane containing primarily diorganosiloxane units, but which can contain some triorganosiloxane, some monoorganosiloxane and some $SiO_2$ units. These materials are well known in the art. The ratio of organic radicals to silicon atoms is preferably within the range of from 1.98:1 to 2.01:1. Generally, the preferred polymers are diorganopolysiloxanes endblocked with hydroxyl radicals, alkoxy radicals, vinylsilyl radicals, acyl radicals or hydrogen atoms. These groups can also be along the polymer chain.

Preferably at least 50% of the organic radicals in the "essentially diorganopolysiloxane" are methyl radicals, but this is not required. The remaining organic radicals can be any monovalent hydrocarbon radical, halogenated monovalent hydrocarbon radical or cyanoalkyl radical. More specifically, the remaining organic radicals can be, for example, alkyl radicals such as the methyl, ethyl, isopropyl, tert-butyl, 2-ethylhexyl, dodecyl and octadecyl radicals; cyanoalkyl radicals such as beta-cyanoethyl, gamma-cyanopropyl, omega-cyanobutyl and omega-cyanoheptyl; alkenyl radicals such as the vinyl, allyl and hexadienyl radicals; cycloalkyl radicals such as the cyclopentyl and cyclohexyl radicals; cycloalkenyl radicals such as the cyclopentenyl and cyclohexenyl radicals; aryl radicals such as the phenyl, naphthyl and xenyl radicals; aralkyl radicals such as the benzyl, phenylethyl and xylyl radicals and alkaryl radicals such as the tolyl and dimethylphenyl radicals. These monovalent hydrocarbon radicals can be halogenated to give such radicals as the chloromethyl, 3,3,3-trifluoropropyl, perchlorophenyl, 2,3-dibromocyclohexyl, $\alpha,\alpha,\alpha$-trifluorotolyl, 2,4-dibromobenzyl, difluoromonochlorovinyl, $\alpha,\beta,\beta$-trifluoro-$\alpha$-chlorocyclobutyl and 2-iodocyclopenten-3-yl radicals, all of which are operative.

The siloxane polymers range from fluids having at least 100 siloxane units per molecule to non-flowing gums. In order to facilitate mixing the siloxanes they should be either readily deformable or soluble in an organic solvent such as benzene. Methods for preparing the siloxane polymers are well known in the art and adequately described in the patent literature.

Any curing system for the siloxane can be employed. For heat curing systems the common commercial vulcanizing agents are organic peroxides containing at least one aromatic acyl radical in the molecule and used in a ratio of from 0.1 to 10 parts of peroxide per 100 parts of siloxane. The best examples of these are tertiary-butylperbenzoate, di-tertiarybutyl peroxide, bis-dichlorobenzoyl peroxide and benzoyl peroxide.

For room temperature-vulcanizing systems a variety of catalysts are possible. One such system disclosed by Keith E. Polmanteer in his copending application Serial Number 632,630, filed January 7, 1957, now U.S. Patent No. 2,927,907, consists of mixing an acid-free diorganopolysiloxane and a hydrocarbonoxy silicate in the presence of a metallic carboxylic acid salt catalyst. A variation of this system is disclosed by Alan D. Chipman in his copending application Serial Number 691,176, filed October 21, 1957, now U.S. Patent No. 2,902,462 employing a Cellosolve silicate with the metallic carboxylic acid salt. Another system disclosed by Robert R. Selfridge in his copending application Serial Number 554,636, filed December 22, 1955, consists of mixing with a hydroxylated diorganopolysiloxane a small amount of organohydrogensiloxane. A third system disclosed by Leonard B. Bruner in his copending application Serial Number 723,110, filed March 24, 1958, now abandoned, consists of merely exposing certain acyloxy-endblocked diorganosiloxanes to moisture.

In addition, the siloxane compositions can be cured by exposing them to high energy electrons or to electromagnetic radiation such as X-rays, gamma-rays or ultraviolet light.

The organopolysiloxanes employed in this invention can be unfilled or filled as desired. The fillers employed can be any of the inorganic heat stable fillers normally employed with siloxane elastomers. Such fillers include metallic oxides such as titania, ferric oxide, zinc oxide and the like, fibrous fillers such as asbestos and glass, and siliceous fillers such as diatomaceous earth and crushed quartz. However, the benefits of the additives of this invention are best realized with siloxane stocks incorporating any of the well known reinforcing silica fillers, e.g. fume silicas, silica aerogels and precipitated silicas, having a surface area greater than 50 square meters per gram. These fillers, if desired, can have organosilyl groups attached to the surface thereof. All of these fillers are well known in the art. From 20 to 200 parts, but generally from 20 to 80 parts, of the reinforcing silica fillers are employed per 100 parts of siloxane while up to 400 parts of other fillers can be employed.

The ferric hydroxide employed in this invention is a well known and commercially available chemical. At least 0.001 part, preferably 0.03 part, by weight of iron as ferric hydroxide must be added per 100 parts by weight of siloxane in order to detectably improve the heat stability of the siloxane. Over 0.75 part by weight of iron as ferric hydroxide per 100 parts by weight of siloxane generally fails to further improve heat stability of the siloxane and in some cases actually decreases heat stability from the optimum. The preferred range is from about 0.03 to 0.4 part by weight of iron as ferric hydroxide per 100 parts by weight of siloxane. The ferric hydroxide can be added as a dry powder or as a wet paste, or as a slurry in alcohols, siloxanes or water. While it is effective in all forms, the wet forms appear to be more easily dispersed in the siloxane gum.

The stabilized products of this invention are useful in any application where non-stabilized elastomers are utilized. However, they are particularly useful for gaskets, caulking, tubing or the like to be used where heat conditions are severe.

The following examples are merely illustrative and are not intended to limit this invention which is properly delineated in the claims.

EXAMPLE 1

Base composition I employed in this example consisted of 100 parts by weight of a vinyldimethylsiloxy-endblocked copolymer consisting of 99.858 mol percent dimethylsiloxane units and 0.142 mol percent vinylmethylsiloxane units and having a Williams plasticity of .040 inch, 40 parts by weight of a reinforcing fume silica filler and 9 parts by weight of a 40 cps. hydroxylated dimethylpolysiloxane (3.7% by weight silicon-bonded hydroxyl groups) to retard crepe hardening.

Base composition II consisted of 100 parts by weight of the vinyldimethylsiloxy-endblocked dimethylsiloxane-vinylmethylsiloxane copolymer in base composition I and 60 parts by weight of a hydrophobed silica xerogel filler of the type described in U.S. Patent 2,863,846.

Various amounts of iron-containing additives were milled into samples of these base compositions as shown below. Additive A consisted of a 4.3% by weight dispersion of ferric hydroxide in hexamethyldisiloxane. Additive B consisted of ferric hydroxide prepared by evaporating the hexamethyldisiloxane from additive A. Additive C was primarily ferric oxide prepared by heating additive B to condense the hydroxyl groups and drive off the resulting water. Additive D was a commercial ferric oxide known as Mapico Red. After the addition of additive A the resulting composition in each case was devolatilized for 2 hours at 150° C.

2.5 parts by weight of VA (which is a 40% by weight solution of bis-dichlorobenzoyl peroxide in a 1000 cps. dimethylpolysiloxane) were milled into each of the resulting mixtures. Each of the resulting blends was press-molded 5 minutes at 125° C. followed by precuring for one hour at 150° C. Subsequently, the samples were heat aged for 24 hours at 600° F. (316° C.). The tensile strength (T) in pounds per square inch and percent elongation (E) at break for each sample were then measured. The results were as follows:

*Table I*

| Parts by weight Fe per 100 parts base copolymer | Additive | Base composition | After heat aging | |
|---|---|---|---|---|
| | | | T | E |
| Control | | I | Brittle | |
| Do | | II | Brittle | |
| 0.088 | B | I | 445 | 163 |
| 0.088 | B | II | 648 | 80 |
| 0.176 | A | I | 667 | 207 |
| | B | I | 647 | 185 |
| | C | I | Brittle | |
| | D | I | Brittle | |
| | A | II | 717 | 117 |
| | B | II | 740 | 105 |
| | C | II | Brittle | |
| | D | II | Brittle | |
| 0.352 | A | I | 642 | 130 |
| | B | I | 625 | 150 |
| | C | I | Brittle | |
| | D | I | Brittle | |
| | A | II | 733 | 63 |
| | B | II | 850 | 100 |
| | C | II | Brittle | |
| | D | II | Brittle | |
| 0.704 | A | I | 593 | 70 |
| | B | I | 590 | 90 |
| | C | I | Brittle | |

EXAMPLE 2

Base composition III employed in this example consisted of 100 parts by weight of a hydroxyl-endblocked copolymer consisting of 99.858 mol percent dimethylsiloxane units and 0.142 mol percent vinylmethylsiloxane units and having a Williams plasticity of approximately .060 inch, 40 parts by weight of a reinforcing fume silica filler, 8.2 parts by weight of a 40 cps. hydroxylated dimethylpolysiloxane (3.7% by weight silicon-bonded hydroxyl groups) and 2.5 parts by weight of VA.

Additives B and D of Example 1 were added by milling in the amounts shown below to samples of base composition III. Each of the resulting mixtures was press-molded 5 minutes at 125° C. followed by precuring for one hour at 150° C. Subsequently, the samples were heat aged for 24 hours at 600° F. (316° C.) after which the tensile strength (T) in pounds per square inch and the percent elongation (E) at break for each sample were measured. The results were as follows:

*Table II*

| Parts by weight Fe per 100 parts base copolymer | Additive | After heat aging | |
|---|---|---|---|
| | | T | E |
| Control | | Brittle | |
| 0.088 | B | 600 | 160 |
| 0.176 | B | 570 | 140 |
| 0.704 | D | Brittle | |
| 2.112 | D | 540 | 130 |

EXAMPLE 3

Base composition IV employed in this example consisted of 100 parts by weight of the hydroxyl-endblocked dimethylsiloxane - vinylmethylsiloxane copolymer employed in base composition III above, 40 parts by weight of a reinforcing fume silica filler, 12 parts by weight of a 40 cps. hydroxylated dimethylpolysiloxane (3.4% by weight silicon-bonded hydroxyl groups) and 2.5 parts by weight of VA.

Base composition V consisted of 100 parts by weight of the hydroxylated dimethylsiloxane-vinylmethylsiloxane copolymer employed in base composition III above, 60 parts by weight of a hydrophobed silica xerogel filler of the type described in U.S. Patent 2,863,846 and 2.5 parts by weight of VA.

Two forms of dry ferric hydroxide additives were employed. Additive E was ferric hydroxide produced by evaporating all the water from a water dispersion at 105° C. (16 hours). Additive F was ferric hydroxide produced by evaporating all the methanol from a methanol dispersion at 105° C. (16 hours).

Additives E and F were added as 20% by weight dispersions in base compositions IV and V respectively to samples of base compositions IV and V respectively in the amounts shown below. Additive E turned the samples a light reddish brown. Additive F turned the samples a light tan-brown color. Each of the resulting mixtures was processed as in Example 2 and the tensile strengths and elongations determined after heat aging 24 hours at 600° F. (316° C.). The results were as follows:

*Table III*

| Parts by weight Fe per 100 parts base copolymer | Additive | Base composition | After heat aging | |
|---|---|---|---|---|
| | | | T | E |
| Control | | IV | Brittle | |
| Do | | V | Brittle | |
| 0.088 | E | V | 800 | 80 |
| | F | V | 790 | 110 |
| 0.176 | E | IV | 443 | 90 |
| | E | IV | 495 | 100 |
| | F | V | 785 | 120 |
| | F | V | 860 | 130 |
| 0.352 | E | IV | 573 | 155 |
| | E | IV | 497 | 113 |
| | F | V | 840 | 135 |
| 0.704 | E | V | 865 | 120 |
| | F | V | 860 | 140 |
| | F | V | 795 | 80 |

EXAMPLE 4

Base composition VI of this example consisted of 100 parts by weight of a vinyldimethylsiloxy-endblocked copolymer consisting of 99.858 mol percent dimethylsiloxane units and 0.142 mol percent vinylmethylsiloxane units and having a Williams plasticity of .040 inch, 35 parts by weight of a reinforcing fume silica, 1 part by weight tris-trimethylsilyl borate to retard crepe aging and 2.5 parts by weight of VA.

Additive G employed in this example was a mixture of 10 parts by weight of a 40 cps. hydroxylated dimethylpolysiloxane (from 3.1 to 3.8% by weight silicon-bonded hydroxyl groups) and 30 parts by weight of wet ferric hydroxide thoroughly washed with isopropanol and filtered. The analysis of G showed 12.25% by weight Fe.

Additive G was milled into base composition VI in such amounts as to give the amounts shown of iron present per 100 grams of base copolymer in each sample. Each of the resulting mixtures was processed as in Example 2 and tensile strengths and elongations determined after heat aging 24 hours at 600° F. The results were as follows:

Table IV

| Parts by weight Fe per 100 parts base copolymer | After heat aging | |
|---|---|---|
| | T | E |
| Control | Brittle | |
| 0.033 | 695 | 180 |
| 0.044 | 645 | 145 |
| 0.066 | 660 | 130 |
| 0.088 | 730 | 180 |
| 0.110 | 675 | 160 |
| Check: 2.112 (added as D) | 660 | 180 |

EXAMPLE 5

Base composition VII consisted of 100 parts by weight of a vinyldimethylsiloxy-endblocked copolymer consisting of 92.358 mol percent dimethylsiloxane units, 7.5 mol percent phenylmethylsiloxane units and 0.142 mol percent vinylmethylsiloxane units and having a Williams plasticity of approximately .060 inch, 60 parts by weight of a hydrophobed silica xerogel filler of the type described in U.S. Patent 2,863,846 and 0.5 part by weight of tert-butylperbenzoate.

Additive H employed in this example consisted of a mixture of 50 parts by weight of a 40 cps. hydroxylated dimethylpolysiloxane (from 3.1 to 3.8% by weight silicon-bonded hydroxyl groups) and 50 parts by weight of a ferric hydroxide prepared in and washed with a 60% by weight methanol water solution and subsequently filtered. Analysis of H showed an iron content of 6.8% by weight.

Additive H was added with milling to base composition VII in such amounts as to give blends having the amounts of iron shown below. These blends were press-molded 10 minutes at 150° C., precured 1 hour at 150° C. and heat aged for 24 hours at 600° F. The tensile strengths and elongations were measured as in the preceding examples with the following results:

Table V

| Parts by weight Fe per 100 parts base copolymer | After heat aging | |
|---|---|---|
| | T | E |
| Control | Brittle | |
| 0.044 | 703 | 45 |
| 0.088 | 763 | 95 |
| 0.176 | 746 | 95 |

EXAMPLE 6

When the following polymers are substituted for the polymer in base composition I in Example 1, similar heat stable silicone elastomers are produced.

A trimethylsiloxy-endblocked dimethylpolysiloxane gum having a Williams plasticity of 0.060 inch.

A hydroxy endblocked 3,3,3-trifluoropropylmethylpolysiloxane gum having a Williams plasticity of 0.040 inch.

A copolymer of 20 mol percent beta-cyanoethylmethylsiloxane units and 80 mol percent dimethylsiloxane units having a Williams plasticity of 0.050 inch.

EXAMPLE 7

Similar thermally stable rubbers are obtained when 0.200 part by weight of iron are added as iron hydroxide to a mixture of 60 parts by weight of a hydrophobed silica xerogel filler of the type described in U.S. Patent 2,863,846, two parts by weight dibutyltin diacetate and 100 parts by weight of each of the 100,000 cs. hydroxy-endblocked polysiloxanes shown below and the mixture is compounded with three parts by weight of the respective silicates shown below and the resulting compounds are allowed to cure at room temperature or are heat cured.

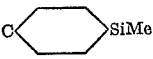

| Siloxane | Silicate |
|---|---|
| EtMeSiO<br>92.5 mol percent Me₂SiO<br>7.5 mol percent ViMeSiO | Ethylpolysilicate |
| Me<br>CF₃CH₂CH₂SiO<br>90 mol percent Me₂SiO | n-Butylorthosilicate |
| 10 mol percent F₃C⟨⟩SiMeO | Isopropylpolysilicate<br>CF₃CH₂CH₂Si(OCH₂CH₂OCH₃)₃ |
| 95 mol percent Me₂SiO<br>5 mol percent Ph₂SiO | Si(OCH₂CH₂OC₂H₅)₄ |

EXAMPLE 8

When the experiments described in Example 1 are repeated omitting only the 40 cps. hydroxylated dimethylpolysiloxane, similar heat stable elastomers are produced.

That which is claimed is:

1. A composition of matter comprising an essentially diorganopolysiloxane containing per silicon atom from 1.98 to 2.01 organic radicals selected from the group consisting of monovalent hydrocarbon radicals, halogenated monovalent hydrocarbon radicals and cyanoalkyl radicals, a reinforcing silica filler having a surface area greater than 50 square meters per gram and from 0.001 to 0.75 part by weight per 100 parts by weight of the diorganopolysiloxane of iron added as ferric hydroxide.

2. A curable composition of matter consisting essentially of an essentially diorganopolysiloxane containing per silicon atom from 1.98 to 2.01 organic radicals selected from the group consisting of monovalent hydrocarbon radicals, halogenated monovalent hydrocarbon radicals and cyanoalkyl radicals, a reinforcing silica filler, a vulcanizing agent and from 0.001 to 0.75 part by weight per 100 parts by weight of the diorganopolysiloxane of iron added as ferric hydroxide.

3. The composition of claim 1 in which at least one-half the organic radicals in the diorganopolysiloxane are methyl radicals.

4. The composition of claim 2 in which at least one-half the organic radicals in the diorganopolysiloxane are methyl radicals.

5. The composition of claim 4 in which the ferric hydroxide is wet with a material selected from the group consisting of alcohols, organosiloxanes and water.

6. The composition of claim 4 in which the ferric hydroxide is added as a dispersion in a diorganopolysiloxane fluid.

References Cited in the file of this patent

UNITED STATES PATENTS

| | | |
|---|---|---|
| 2,452,416 | Wright | Oct. 16, 1948 |
| 2,467,858 | Sage | Apr. 19, 1949 |
| 2,541,137 | Warrick | Feb. 13, 1951 |
| 2,541,642 | Downs et al. | Feb. 13, 1951 |

OTHER REFERENCES

Condensed Chemical Dictionary, Fifth Edition, Reinhold Pub. Corp., New York, page 478.

"Chemistry of the Silicones," Rochow, John Wiley and Sons, Inc., 1946, pages 70–77.